Sept. 22, 1925. 1,554,495

W. A. GARRETT ET AL

DEVICE FOR HEATING WATER

Filed April 10, 1925

Inventors
W. A. Garrett and
J. F. Mieslang
By C. A. Snow & Co.
Attorneys

Patented Sept. 22, 1925.

1,554,495

UNITED STATES PATENT OFFICE.

WILLIAM A. GARRETT AND JERMIAH F. MIESLANG, OF BROOKFIELD, MISSOURI.

DEVICE FOR HEATING WATER.

Application filed April 10, 1925. Serial No. 22,132.

*To all whom it may concern:*

Be it known that we, WILLIAM A. GARRETT and JERMIAH F. MIESLANG, citizens of the United States, residing at Brookfield, in the county of Linn and State of Missouri, have invented a new and useful Device for Heating Water, of which the following is a specification.

This invention aims to provide novel means whereby the water in a receptacle, such as the body of a washing machine, may be heated. Preferred forms are shown, but a mechanic, working within the scope of what is claimed, may make changes without departing from the spirit of the invention.

Figure 1:
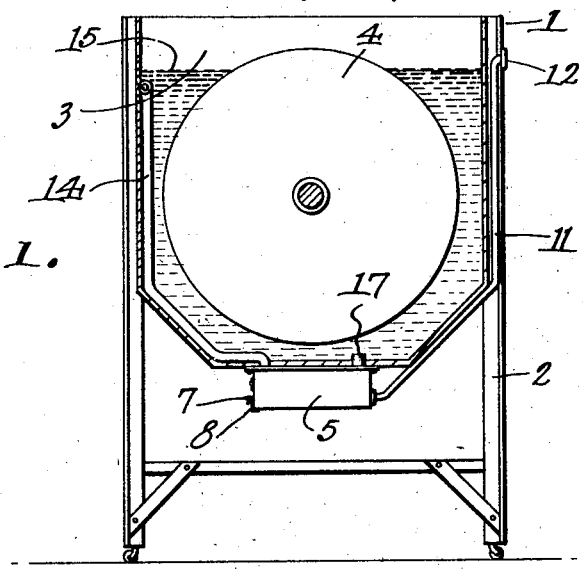
Figure 2:
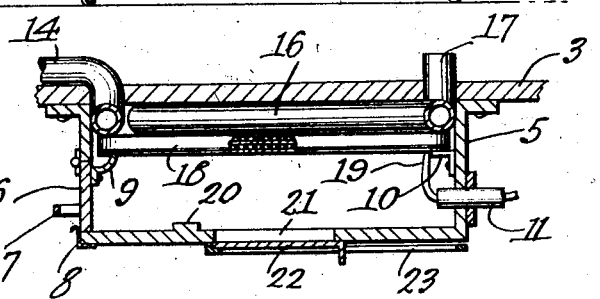
Figure 3:
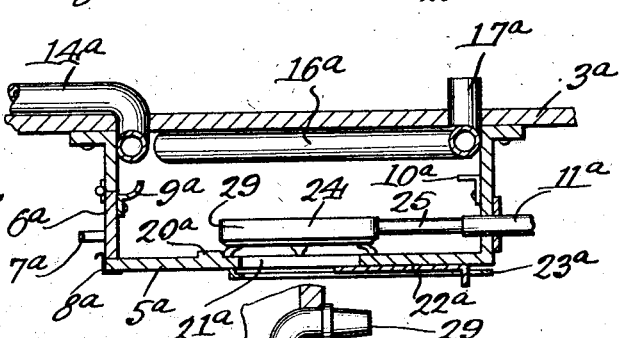
Figure 4:
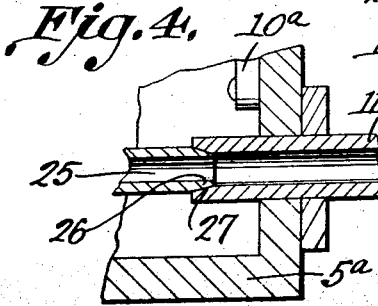
Figure 5:
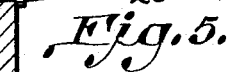

In the drawing:—Figure 1 shows in section, a washing machine wherewith the device hereinafter described has been assembled; Figure 2 is a sectional view showing the casing with an electrical heater therein; Figure 3 is a sectional view showing the casing with a burner therein; Figure 4 is a sectional detail disclosing the connection between the burner and the fuel supply pipe; Figure 5 is a sectional detail showing how the end of the supply pipe is made when a burner is used as shown in Figures 3 and 4.

The numeral 1 designates a washing machine including a frame carrying a receptacle, the frame being marked by the numeral 2 and the receptacle by the numeral 3, the numeral 4 designating any suitable means for agitating the clothes to be washed. A casing 5 is secured to the bottom of the receptacle 3 and has a hinged side door 6 provided with a handle 7 and held closed by a latch 8 on the casing. The door 6 is provided with a support 9. There is a bracket or support 10 on the casing 5 opposite to the support 9. A pipe 11 extends upwardly from the casing 5 to a point near the top of the receptacle 3 and terminates in a socket 12 adapted to receive an electric conductor plug (not shown).

The device includes a conduit having an upstanding end 14 located in the receptacle 3 and discharging in operative position with respect to the level of the water 15, the conduit being extended downwardly into the casing 5 and being formed into a horizontal coil 16 having an inlet end 17 prolonged upwardly through the bottom of the receptacle 3 to a point a little above the upper surface of the bottom, so that sediment, detached buttons and the like cannot find their way too readily into the conduit.

The numeral 18 marks an electric heater for the coil 16, disposed below the coil in close relation thereto. The conductor 19 for the coil is prolonged through the pipe 11 to the socket 12. The heater 18 is carried by the movable support 9 on the door 6 and by the fixed support or bracket 10 on the casing 5. There is an upstanding projection 20 on the bottom of the casing 5, and the bottom of the casing has a draft opening 21 controlled by a slidable damper 22 mounted to reciprocate in a guide 23 on the bottom of the casing 5.

In practical operation, referring to assembly, the damper 22 is opened, and the door 6 is opened. The heater 18 is introduced into the casing 5 through the door way and is engaged with the support 10. The operator inserts his hand through the opening 21, holds up the heater, and then closes the door 6, the door being held closed by the latch 8, and the support 9 swinging into place beneath the heater 18. The hand of the operator is withdrawn from the opening 21, and the damper 22 is closed, generally, because there is no occasion for the use of a damper in connection with an electric heater. The water enters the conduit through the end 17, circulates in the coil 16, is heated by the burner 18, rises through the end 14 of the conduit, and is discharged into the receptacle 3, a circulation of water thus being brought about.

In Figures 3, 4 and 5, parts hereinbefore described are designated by numerals previously used, with the suffix, "a". The modification consists in replacing the electric heater 18 by a burner 24, the pipe 25 of which has a tapered end 26 held in a conical seat 27 that is formed in the inner end of the pipe 11a, one or more of the legs 29 of the burner 24 engaging the projection 20a to hold the end 26 of the pipe 25 in the seat 27 of the pipe 11a. The pipe 11a is used to convey fuel to the burner 24 and the pipe 11a, therefore, terminates at its upper end, as shown at 29, in any suitable means whereby a coupling may be effected with the fuel supply.

Although Figures 3 and 4 have been alluded to as showing modifications, the casing and parts assembled therewith present a unitary invention, in that they afford, in an article of manufacture of the class described, means whereby burners of different sorts may be mounted in place, at the will of an operator, without making changes in the casing. The general construction of the device is such that a manufacturer or seller of washing machines may, in a few minutes, adapt the machine to electric heating or to fuel heating, as the purchaser may demand.

Having thus described the invention, what is claimed is:—

1. A device of the class described, embodying a receptacle and a casing on the bottom of the receptacle, the casing being characterized by the provision of mechanism whereby different heaters may be mounted in the casing, said mechanism comprising a hinged door for the casing, a support on the door, a second support on the casing in spaced relation to the door, a projection on the bottom of the casing, the bottom of the casing being provided with an opening.

2. In a device of the class described, a receptacle, a casing on the bottom of the receptacle, a hinged door for the casing, a support on the door, a support on the casing, and a heater in the casing and carried by the supports.

3. A device of the class described, constructed as set forth in claim 2, and further characterized by the fact that the casing has an opening through which the heater may be upheld whilst the door is being closed to bring the door-carried support beneath the heater.

In testimony that we claim the foregoing as our own, we have hereto affixed our signatures.

WIILIAM A. GARRETT.
JERMIAH F. MIESLANG.